US 6,633,909 B1

(12) United States Patent
Barrett et al.

(10) Patent No.: US 6,633,909 B1
(45) Date of Patent: Oct. 14, 2003

(54) NOTIFICATION METHOD THAT GUARANTEES A SYSTEM MANAGER DISCOVERS AN SNMP AGENT

(75) Inventors: Jeffrey Lee Barrett, Wake Forest, NC (US); Simon C. Chu, Chapel Hill, NC (US); David Joseph Doria, Raleigh, NC (US); Christopher C. Gaskins, Cary, NC (US); James Franklin Macon, Jr., Apex, NC (US); Gregg Matthew Margosian, Raleigh, NC (US); Michael Robert Primm, Apex, NC (US); Gregory Brian Pruett, Raleigh, NC (US); Jianping Yang, Raleigh, NC (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 09/404,063

(22) Filed: Sep. 23, 1999

(51) Int. Cl.[7] .............................................. G06F 15/173
(52) U.S. Cl. ........................................ 709/224; 709/223
(58) Field of Search ................................ 345/733–740; 709/223–224, 245; 713/1–2

(56) References Cited

U.S. PATENT DOCUMENTS

| 5,185,860 A | * | 2/1993 | Wu ............................... 709/224 |
| 5,446,897 A | * | 8/1995 | Mathias et al. ................. 707/1 |
| 5,710,885 A | * | 1/1998 | Bondi ........................ 709/224 |
| 5,787,252 A |   | 7/1998 | Schettler et al. ............. 709/224 |
| 5,796,736 A |   | 8/1998 | Suzuki et al. ................. 370/399 |
| 5,802,146 A | * | 9/1998 | Dulman .................... 379/32.03 |
| 5,812,771 A |   | 9/1998 | Fee et al. ................... 709/201 |
| 5,835,720 A |   | 11/1998 | Nelson et al. ............... 709/224 |
| 5,909,549 A |   | 6/1999 | Compliment et al. ........ 709/223 |
| 5,933,416 A |   | 8/1999 | Schenkel et al. ............ 370/254 |
| 5,964,837 A | * | 10/1999 | Chao et al. ................... 709/224 |
| 6,028,863 A | * | 2/2000 | Sasagawa et al. ........... 370/399 |
| 6,052,727 A | * | 4/2000 | Kamalanathan ............. 709/224 |
| 6,154,458 A | * | 11/2000 | Kudoh et al. ........... 370/395.53 |
| 6,167,403 A | * | 12/2000 | Whitmire et al. .............. 707/10 |
| 6,253,243 B1 | * | 6/2001 | Spencer ....................... 709/224 |
| 6,360,260 B1 | * | 3/2002 | Compliment et al. ........ 709/224 |
| 6,430,596 B1 | * | 8/2002 | Day, II ........................ 709/202 |
| 6,456,306 B1 | * | 9/2002 | Chin et al. .................... 345/810 |
| 6,490,617 B1 | * | 12/2002 | Hemphill et al. ............ 709/223 |

OTHER PUBLICATIONS

Case, J., et al., A Simple Network Management Protocol, RFC–1157, Network Working Group, IETF, pp. 1–32, May 1990.*
IBM Technical Disclosure Bulletin, vol. 41, No. 01, Jan. 1998, "Secure Remote Configuration for Networked Computer Systems," pp. 653–655.

* cited by examiner

Primary Examiner—Andrew Caldwell
(74) Attorney, Agent, or Firm—Bracewell & Patterson LLP

(57) ABSTRACT

A method for a guaranteeing a network manager discovers SNMP agents on a communications network. Each SNMP agent transmits a trap to the network manager. The trap contains the network manager's IP address and the SNMP agent's identifying information, including its IP address. When the trap is received at the network manager, it is parsed for the agent identifying information, which is compared against a list of previously identified/discovered agents. If the agent identifying information is not found, i.e., if the agent is a newly discovered agent, the network manager adds the agent to the list of discovered agents. The agent is then registered/stored in the discovered agents file. When the trap does not include sufficient identifying information, the network manager sends a query to the agent to extract additional identifying information. The system manager is thus able to discover all connected agents without broadcasting a query message.

18 Claims, 3 Drawing Sheets

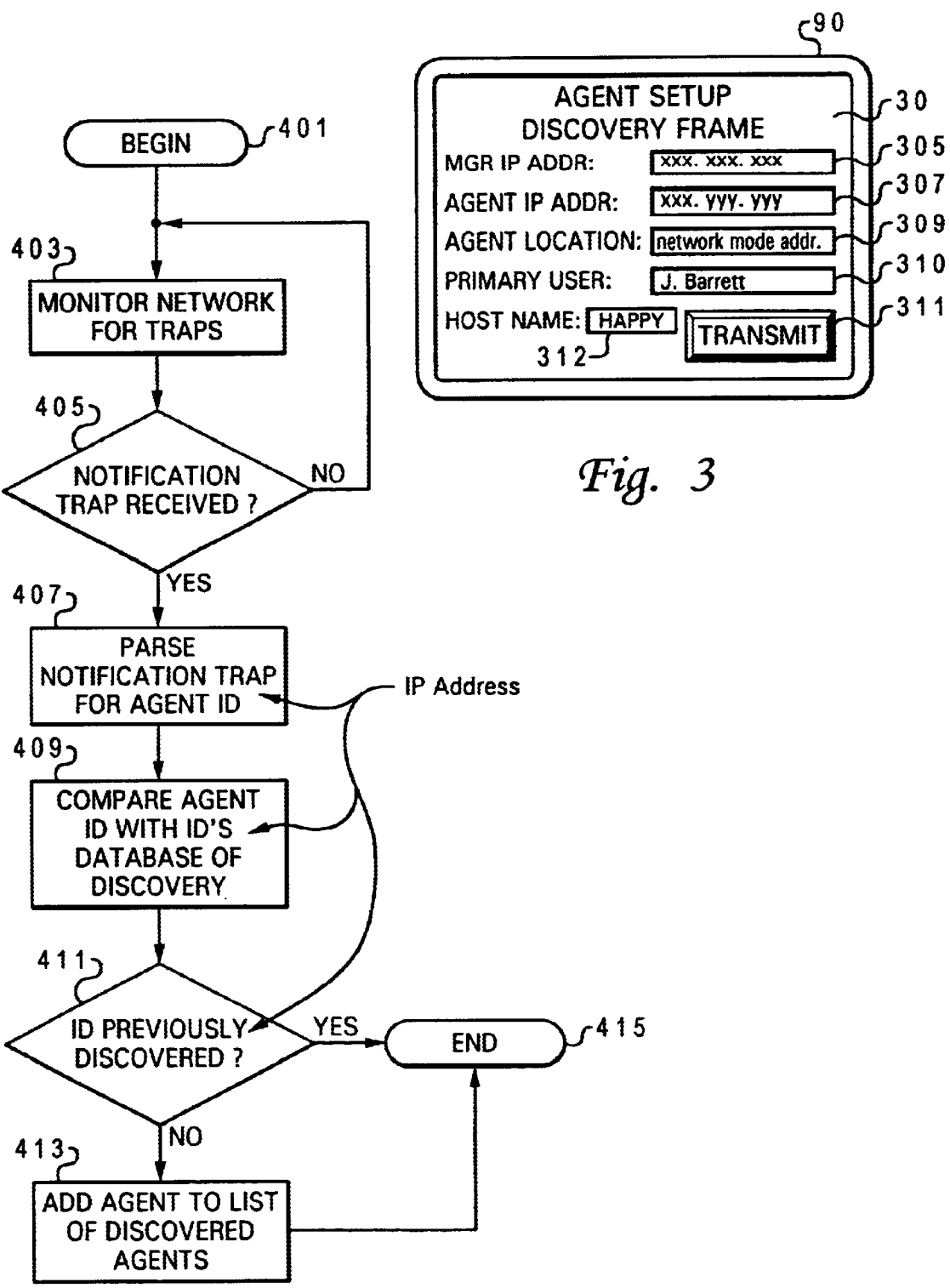

NOTIFICATION METHOD THAT GUARANTEES A SYSTEM MANAGER DISCOVERS AN SNMP AGENT

BACKGROUND OF THE INVENTION

1. Technical Field

This invention relates to communications networks, and in particular to a method for discovering SNMP agents on a communication network. Still more particularly, the present invention relates to a notification method which guarantees that a system manager discovers SNMP agents on a communications network.

2. Description of the Related Art

The technological development of communication networks is increasing at a fast pace. Network developers are continually searching for more efficient ways to complete network processes. A typical network consists of a web-like set of communication links to which are connected a plurality of agents. Agents on a network may be either a hardware device such as a router or a software application running on a processor system. Agents have traditionally been homogenous; however as networks become more complex, agents are becoming more and more heterogenous. As network complexity increases, it becomes more difficult to determine which agents are connected to the network.

A network could be a collection of voice, video, or data processing devices connected by communication lines. The method of transmission on the network is also key to determining the speed of transmission. Most present network connections utilize the Transmission Control Protocol/Internet Protocol (TCP/IP) as their transmission medium. The agents connected to these networks, in turn, utilize a Simple Network Management Protocol (SNMP), and are referred to as SNMP agents.

Networks are thus managed by a network management tool or network manager. A network manager is connected to one of the links of the network and utilized to monitor and manage the network's links, agents, and network functions. To provide effective management, the network manager must therefore be aware of which agents are connected to the network in order to efficiently monitor the agent processes. Additionally, a network manager needs management information about the network to help conceptualize the network and call attention to adverse changes in a fast and accurate manner.

Agent discovery process is therefore one important element to consider in the design of a network and the network manager. When a new agent is connected or a previously connected agent is reconnected, the network management station has to be made aware of the presence of the agent. A standard approach in discovering SNMP agents by a system manager is to broadcast a query message over the network and wait for acknowledgment. U.S. Pat. Nos. 5,933,416 and 5,835,720 utilize this broadcast query and acknowledgment method. This standard approach floods the network with its broadcasting message. Also, with this method, some SNMP agents may respond and some may not for various reasons. As a result there is no guarantee that all agents will be discovered.

Most current networks are configured with TCP/IP. The network management protocol of TCP/IP is Simple Network Management Protocol (SNMP). In SNMP, agents, which can be hardware as well as software, monitor the activity in the various devices on the network and report to the network manager. Control information about each device is maintained in a management information block.

Another prior art method utilizes a simple polling approach to gather network information. This method has severe problems in wasting network bandwidth, as described in Rose, "The Simple Book," p. 76, Englewood Cliffs, N.J. Prentice Hall Inc. This is of special concern in wide-area networks where recurring transmission line expenses directly affect the cost of network operation. Bandwidth used by management traffic comes at the expense of user bandwidth. Even in broadband networks, such as ATM networks, minimizing management bandwidth usage is a concern.

U.S. Pat. No. 5,909,549 describes a method which allows the SNMP managed device (agent) to register with a Network manager by generating and transmitting a frame. The process of transmitting the frame continues until the management station responds with another frame acknowledging receipt. That system further has a timer which determines when a follow up frame should be sent if the frame acknowledging receipt is not sent to the managed device. Like the traditional methods, this method results in a clustering of network resources with management frames utilizing valuable bandwidth. Also, the method requires a user to send a proprietary form of frame (trap) to communicate with the network manager and involves a series of unnecessarily complicated handshakes to complete the process. Further this method is system specific, i.e., it does not allow the discovery of different types of agents as in heterogenous networks. Further, like other prior art methods it results in a low success rate of discovery.

To build and continuously update a reliable network, information must be collected from each network node. The challenge is to do this in real time without adversely consuming network bandwidth, while increasing the success rate of agents discovery.

The present invention recognizes that it is advantageous to have a method and system for efficiently discovering an SNMP agent on a network without using significant amounts of bandwidth or incurring the potential errors of the broadcast query and acknowledgment method. The present invention substantially reduces or eliminates the potential for errors by having the agents themselves notify the network manager and thus increasing the success rate of discovery.

SUMMARY OF THE INVENTION

It is therefore one object of the present invention to provide an improved communications network.

It is another object of the present invention to provide an improved method for discovering SNMP agents on a communications network.

It is yet another object of the present invention to provide a method for efficiently discovering SNMP agents on a communications network by having the agents notify the network manager directly.

The foregoing objects are achieved as is now described. A method for a guaranteeing a network manager discovers SNMP agents on a communications network is disclosed. Each SNMP agent transmits a trap via network links to the network manager. The trap contains the network manager's IP address and the agents identifying information, such as its IP address. When the trap is received at the network manager, it is parsed for the agent identifying information, which is compared against the list of previously identified/discovered agents. If the agent identifying information is not found, which indicates that it is a newly discovered agent, the network manager adds the agent to the list of discovered agents on the network. The agent is then registered/stored in the discovered agent file. When the trap does not include sufficient identifying information, the network manager sends a query to the agent to extract additional identifying information. The system manager is thus able to discover all connected agents over a period of time without having to broadcast a query message or unnecessarily flood the network with traffic.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a diagram of a registration graphical user interface (GUI) for entering agent identifying information, etc. during agent notification in accordance with one embodiment of the present invention; and FIG. 4 is a logic flow chart of the process of receiving and analyzing a trap at the network manager in accordance with a preferred embodiment of the present invention.

DETAILED DESCRIPTION OF PREFERRED EMBODIMENT

Figure 1:
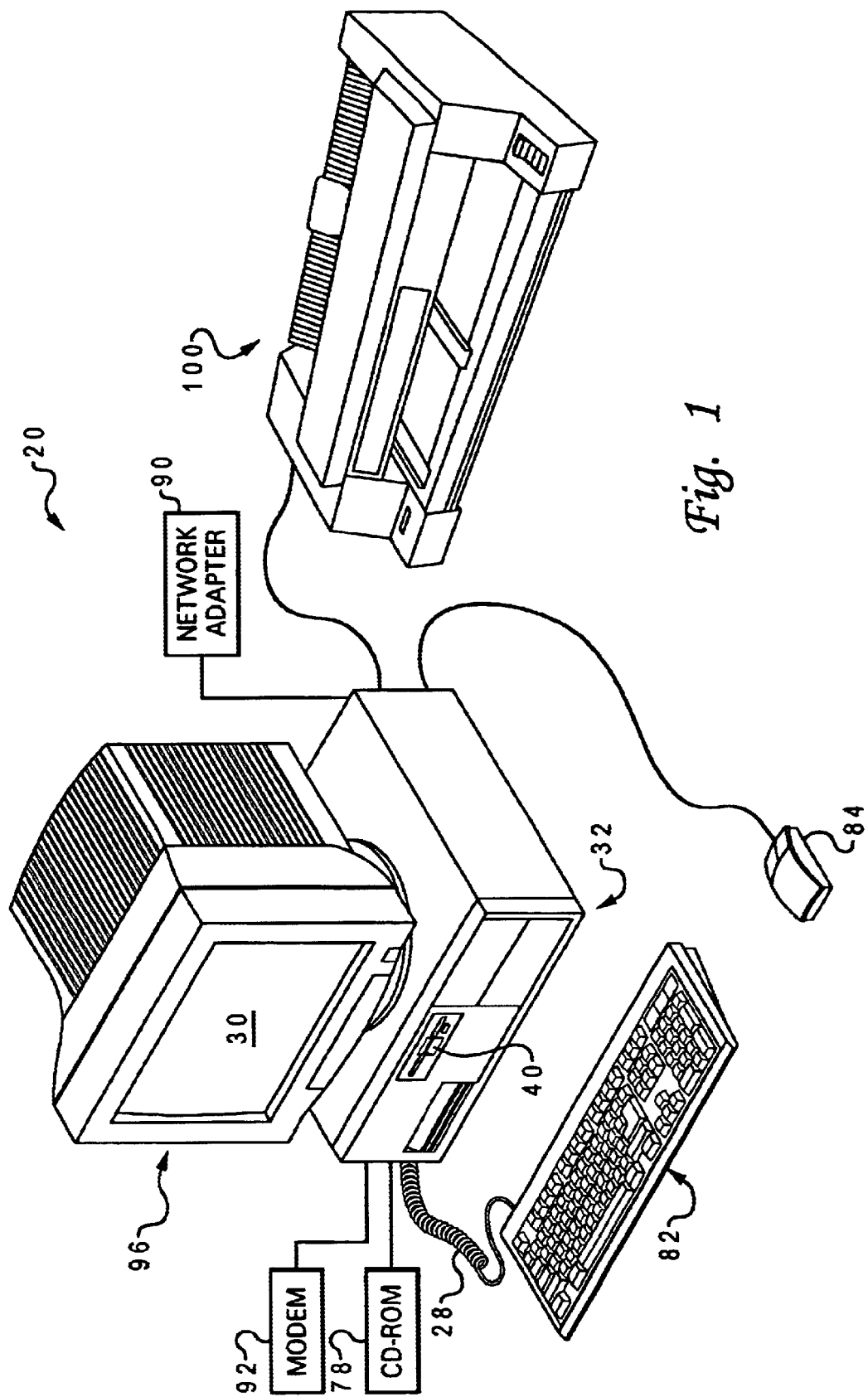
FIG. 1 is a diagram of a data processing system utilized in accordance with a preferred embodiment of the present invention.

The present invention guarantees with a high degree of confidence that a network management tool (network manager) discovers SNMP agents connected to the network. With reference now to the figures, and in particular with reference to FIG. 1, there is depicted the basic structure of a data processing system 20 utilized in one embodiment of the invention. Data processing system 20 has at least one central processing unit (CPU) or processor housed in casing 32. CPU is connected to several peripheral devices, including input/output devices such as a display monitor 96, keyboard 82, graphical pointing device 84, and printer 100 for user interface. Also housed in casing 32 are a permanent memory device (such as a hard disk) for storing the data processing system's operating system and user programs/applications, and a temporary memory device (such as random access memory or RAM) that is utilized by CPU to implement program instructions. CPU communicates with the peripheral devices by various means, including a bus or a direct channel (more than one bus may be provided utilizing a bus bridge).

Data processing system 20 may have many additional components which are not shown such as serial, parallel, and USB ports for connection to, e.g., modems 92 or CD ROM 78. In the preferred embodiment of the invention, communication to the data processing system 20 is made possible via modem 92 connected to a land line or wireless telephone system which is in turn connected to a local communications network provider such as an Internet Service Provider (ISP). Additionally, data processing system 20 may be connected to a network via an ethernet/network card or adapter 90. Communicated data arrives at the modem or network card and is processed to be received by the data processing system's CPU or other software application.

Those skilled in the art will further appreciate that there are other components that might be utilized in conjunction with those shown in the block diagram of FIG. 1; for example, a display adapter connected to processor might be utilized to control a video display monitor 30, and a memory controller may be utilized as an interface between temporary memory device and CPU. Data processing system 20 also includes firmware whose primary purpose is to seek out and load an operating system from one of the peripherals (usually permanent memory device) whenever the data processing system is first turned on. In the preferred embodiment, data processing system contains a relatively fast CPU along with sufficiently large temporary memory device and space on permanent memory device, and other required hardware components.

Conventional data processing systems often employ a graphical user interface (GUI) to present information to the user. The GUI is created by software that is loaded on the data processing system, specifically, the data processing system's operating system acting in conjunction with application programs. In one embodiment of the invention, a GUI is utilized during the registration process on the agent, as will be described with reference to FIG. 3 below.

Modem 92 can be utilized to connect data processing system 20 to an on-line information service or an Internet service provider. Modem 92 is one method of connecting data processing system to the network of the present invention. Modem 92 may also provide a connection to other sources of software, such as a server, an electronic bulletin board (BBS), or the Internet (including the World Wide Web).

The implementation of the present invention preferably occurs on a number of data processing systems, i.e., the network manager discovery functionality and SNMP agent notification functionality are completed with a data processing system. It is understood however, that other types of data processing systems are possible, which may have some or more of the basic components described above. Additionally, those skilled in the art understand that the term 'agent' as utilized herein is not limited to a data processing system.

Figure 2:
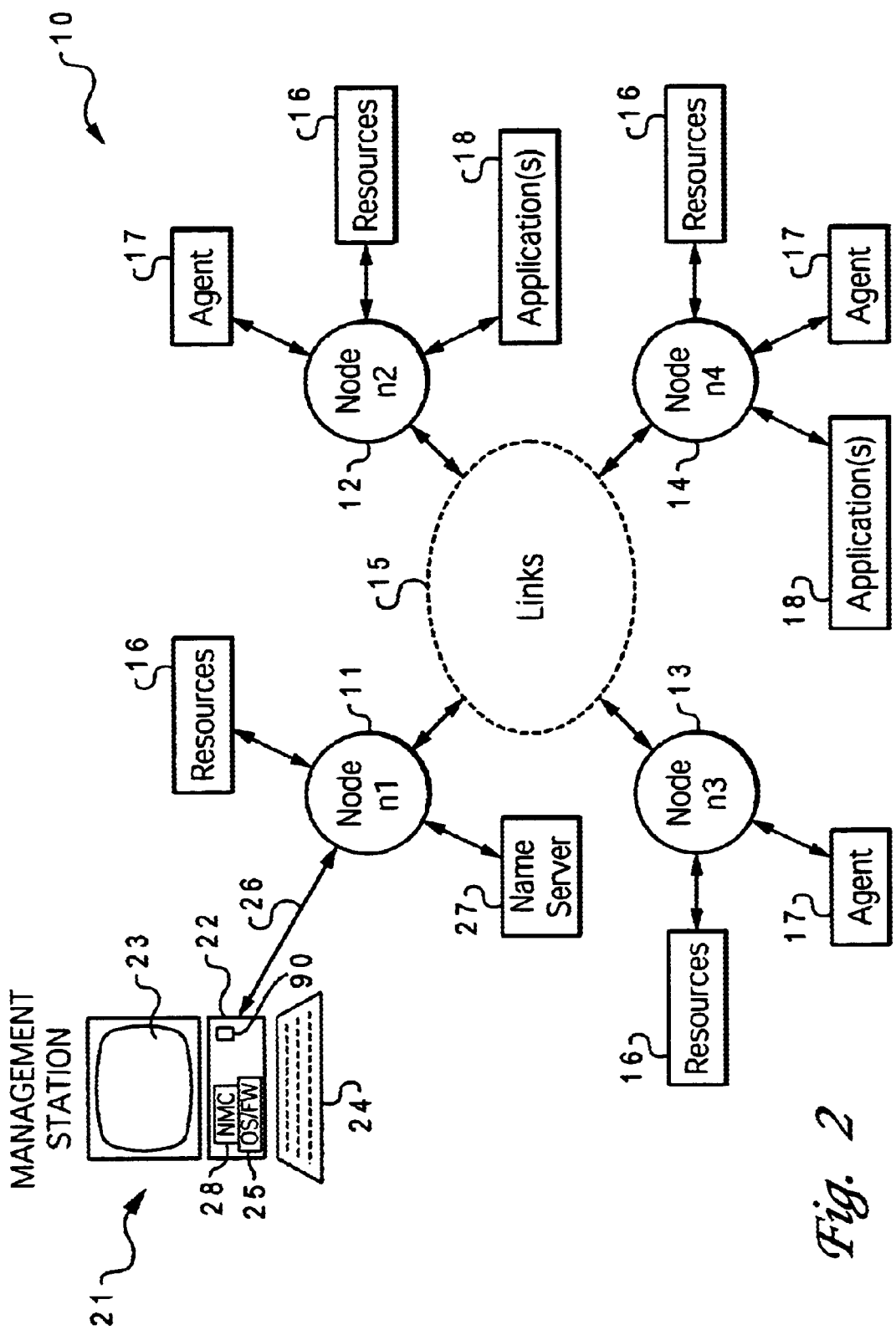
FIG. 2 is a diagram of a communications network utilized in accordance with one embodiment of the present invention.

Referring now to FIG. 2, a network 10 is illustrated in which features of the invention may be implemented. In this example, four nodes 11, 12, 13, and 14, are illustrated in the network. These nodes are also referred to as nodes n1, n2, n3, and n4. Each node is a network device, often a computer, i.e., a data processing system which is capable of executing various tasks and processes, including that of sending messages to other nodes and responding to messages from other nodes. This network 10 may be of any one or a mixture of various network technologies, including token nng, Ethernet, point-to-point, satellite links, etc. There is usually some type of defined path or link between each node 11–14 and each one of the other nodes that is in the network, and this linkage is represented by the network connection links 15 of FIG. 2. The connection links 15 may be constructed using any communication medium commonly used in networks, e.g., buses between computers, telephone lines, T1 trunk connections, satellite links, or other such links. The network 10 of FIG. 2 may be what is generally termed a local area network (LAN) or wide area network (WAN), or combinations of LANs and WANs; the principles herein described could be used in a local area network interconnected by Ethernet or token ring technology, or others as maybe suitable. Each one of the nodes 11–14 is usually connected to other nodes or terminals (workstations, desktop computers, printers, system resources, etc.), not shown, by local area networks or the like, and it is of course understood that a typical network in which the invention is useful may have a large number of nodes, spread over sites that may be local or separated by long distances. The network preferably supports or utilizes TCP/IP as its transmission protocol. Those skilled in the art are familiar with TCP/IP and its functionalities.

Connected to the nodes 11–14 are various network resources 16, which may consist of printers, bulk storage facilities, processing devices, communications links to other networks, name servers, or servers of various types. These network resources are accessible by all nodes in the network, in the usual practice. Each of the nodes 11–14 and network resources 16 has a status which can be reported to a network manager 21, as by a local (network) agent 17. In the preferred embodiment, local agent 17 and network manager utilized a Simple Network Management Protocol (SNMP) in the discovery process. The local agents 17 are therefore hereinafter interchangeably referred to as SNMP agents.

The nodes 11–14 have applications software 18 executing thereon. For example, a node 12 may have a network interface program running on it, for sending and receiving network traffic (messages) using various protocols. A user of the SNMP agent 17 for this node is thus able to place addressing information and other types of information in a SNMP trap, which can be transferred on the network by standard SNMP file transfer methods.

According to one feature of the invention, a network manager station 21 is employed, shown here connected to n1-node 11. The network manager 21 is illustrated as a workstation or computer terminal having a system unit 22, a monitor 23, and a keyboard 24. Within system unit 22 are hardware and software components that carry out the various network management functions including receiving the notification traps, determining whether the traps contain sufficient identifying data, updating the list of discovered agents, maintaining the list of agents, and sending a query from manager station 21 directly to an agent 17 whose discovery trap does not contain sufficient identifying data. These hardware components include modem 90 and the software components include network management software code 28, which operates on the operating system (OS) and firmware layer 25 to control the required hardware. Of course, the network manager 21 may be a task executing on the same computer that executes the n1-node 11, for example. Only one network manager 21 is shown, but other nodes in the network 10 could be functioning separately as network managers. The network manager 21 includes an applications program executing on a platform or general purpose processor, and has the functions of (1) executing network operator commands, i.e., those issued by a "user" or human operator, (2) communicating with the managed network 10 by messages, ordinarily using packet technology, (3) retrieving management information from other nodes, via the communication links, using messages, such as inquires and responses, (4) presenting the status and/or topology of the network in graphical form such as on the monitor 23 or by printed output, and (5) otherwise to display or present network status information. Each of these functions is performed using technology which is not treated here. The functions are specifically tailored to the invention to permit efficient discovery of agents on the network. The information generated by the network manager 21 can be made available to other management functions such as accounting, connection, performance, etc. As mentioned above, in the preferred embodiment, the network manager 21 and local agents 17 use the SNMP described in detail by Marshall T. Rose, "The Simple Book," Prentice-Hall, 1991, which is hereby incorporated by reference. Software for local agents 17 conforming to SNMP standards is commercially available, and agent source code is available; e.g., a source code SNMP development kit is available from M.I.T. Laboratory for Computer Science, Cambridge, Mass.

Thus, each one of the nodes 11–14 has a special management application called an "agent" running locally, illustrated by SNMP agents 17 in FIG. 2. The main functions supported by an agent are: (1) maintain real time management information related to the resources and networking functions of its own node, locally, (2) receive messages from and send messages to the network manager 21, (3) respond to requests for information retrieval from the network manager 21, via these messages, and, in accordance with the preferred embodiment, (4) emit unsolicited notifications (traps) when defined events such as setup occurs.

In a preferred embodiment, the network manager 21 is not required to establish a connection with each local agent 17 in order to exchange discovery/notification information. The network manager 21 is external to the network, i.e., it could be connected to the network 10 via a communications link to one of the nodes. Thus, one of the nodes is assigned as the gateway—in FIG. 2 the n1-node 11 is the gateway for network manager 21—and the path 26 can be a bus connection, or a connection by a LAN, or the like, i.e., this connection need not be direct. All communication between the manager 21 and the agents 17 must go through the gateway n1-node 11, via path 26 and the links or trunks 15. If this gateway fails, another node may be activated to take over, but there is only one gateway in a network at any one time for a given network manager. Other network managers (not shown) may use the same or different nodes as gateways. The network manager monitors the network for the occurrence of traps from an agent on the network addressed to the network manager.

An agent application 17 is typically activated as part of the start-up procedure of its network node 11–14; however, it may be stopped and reactivated anytime independent of the network manager 21. It also does not require any information about the manager 21 except its IP address. The job of the agent 17 is to make a set of supported management information available to the manager 21. Specifically, in the present invention, the agent is responsible for alerting the manager of its presence on the network. In the preferred embodiment, the agents 17 connected to the network may be of varying types, thus creating a heterogenous network. The discovery process works just as well with each type of agent.

Configuration information such as network node address is required by the network manager 21 to establish connection with each agent 17. To this end, a name server (or database) 27 is available as a resource to the manager 21, as by a task operating on the n1-node 11, although it could be anywhere accessible to the manager 21 on the network. The name server 27 maintains a database of the name and address of each potentially-active/discovered node or resource on the network. Thus the present invention permits the manager to receive unsolicited notifications from agents 17. The present invention recognizes the fact that the accuracy and reliability of current network systems is almost 100% and therefore, no confirmation message is required from the network manager to the agent. This allows the invention to be implemented with very little additional congestion to, or use of, bandwidth on the network due to manager-generated control messages/frames. In the event the network becomes unreliable and causes a notification trap to be lost, the invention allows the agent to be discovered the next time the agent sends a trap. Those skilled in the art appreciate that different forms of traps are occasionally sent from the agent to the network manager. These traps are typically sent to alert the network manager of the occurrence of certain events such as a failure on the network or changes to the configuration of the agent.

In the preferred embodiment of the invention, the network manager functions of the invention are software implemented. The software includes monitoring and discovery algorithms which further effectuate the discovery of agents upon receipt of notification traps. The software is further able to access the database (name server) of discovered agents as discussed above. The software is installed on PC servers, which may be centralized. Also, in the preferred embodiment of the invention, the agent is made to notify the network manager during setup, ensuring the discovery of the agent at as early a time as possible. Typically, during setup, a user enters (or is prompted to enter) the IP address of the network management tool. The user of the agent thus forces a trap to register the agent. The trap may be a coldstart trap (i.e., a trap created and transmitted when the agent is first being set up on the network), or a test trap, or any other type of trap and is transmitted to the network manager with the entered information. The forced trap then notifies the discovery process of the network manager that the SNMP agent is up and running. As a result, the network manager is virtually guaranteed to discover the agent.

The network manager's discovery method operates with all system types. SNMP agents are one of these device types. FIG. 3 illustrates a GUI utilized to enter the relevant addressing and agent identification information included in the notification/discovery trap. In the preferred embodiment of the invention, no specific entry is required for identifying the agent. When a trap is created and sent to the network manager, it automatically contains the IP address of the agent. The network manager then checks the IP address against its database of discovered/registered IP addresses, as will be discussed in further detail below. In an alternative embodiment, as depicted in FIG. 3, the agent identifying information may be entered within the GUI. Use of the term agent identifying information may refer to the IP address as in the preferred embodiment, or the host name of the server/node and is understood to refer t o both embodiments unless otherwise specified. The GUI is depicted on a screen 30 of a monitor 90 of a computer system. Four input areas are illustrated on the GUI. These include the system manager's IP address 305, the agent's identifying information 307, which is typically its IP address, the agent's host name 312, and two other identifying information blocks 309 and 310. In the lower right corner of the GUI is a transmit button 311. Selection of this transmit button 311 by a user after entering the required information, instantiates the transmittal to the network manager of the trap with the entered information. Thus in the preferred embodiment, the system is registered with its IP address.

In the preferred embodiment which utilizes the agents' IP address in the discovery process, when the trap does not contain any identifying information, such as its host name, the system manager may send out a query to the network to get the host name of the system which sent the trap. Additionally, when the trap does not include sufficient identifying information, the system/network manager sends a query to the agent to extract additional identifying information. These are point-to-point transmissions, utilizing little network bandwidth. The underlying transmission mechanisms of TCP/IP and SNMP are well know to those skilled in the art and will not be described herein. Those skilled in the art will also appreciate that there are alternative methods of creating the notification trap (i.e., entering required information for transmission) and instantiating the transmission via the network's connecting links, and that these alternate methods all fall within the scope of the invention.

FIG. 4 illustrates the process of receiving a notification trap and registering the corresponding agent according to the invention. The process begins (step 401) when the network manager is activated. Network manager's discovery process monitors the network for traps (step 403). The network manager listens to a port and receives the SNMP packets (and or traps) transmitted to it over the network. It then analyzes a received trap to determine if it is a notification trap (step 405). If the received trap is not a notification trap, the network manager continues to monitor the network until a notification trap is received. When a notification trap is received, network manager separates (i.e. parses out) the IP address or other identifying information (step 407). The network manager then compares the identifying information against a database of previously discovered agents (step 409). A comparison is made to determine if the agent information has been previously received (step 411), i.e., to determine if the agent was previously registered/discovered on the network. If the agent's IP address or other identifying information is found in the database, then no action is required and the process terminates with respect to that agent; however, if the agent's IP address or other identifying information is not found, then the agent is added to the database of discovered agents (step 413) and the process terminates with respect to that agent (step 415). The process therefore allows for the recording of newly discovered agents without unnecessary broadcast queries over the network.

The database may be stored internally or externally but is immediately accessible to the network manager. Typically, a preliminary list of known agents connected to the network are manually entered into the database by network management personnel when the network manager is first activated. This database is read-writable, thus allowing for it to be dynamically updated as agents are added to or deleted from the network.

In the preferred embodiment, the trap is sent when the SNMP agent is being set up, i.e., a coldstart trap. However, other types of traps may be sent at different times besides setup to complete the notification process. The network manager is designed to recognize different types of agent without any proprietary limitations. This discovery system of non-proprietary, heterogenous agent types is an important aspect of the invention.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A network, comprising:
   a network manager;
   a plurality of agents coupled by connecting links to said network manager each agent being capable of sending a notification trap to said network manager via said connecting links;
   means for transmitting said notification trap from said agent to said network manager, said means being instantiated by a user of said agent and utilizing said connecting links, wherein the transmission of said notification trap is completed without said network manager issuing a broadcast message on the network to solicit said notification trap, and network bandwidth utilized in a notification process is reduced;
   means for receiving said notification trap at said network manager;
   means for said network manager to extract identifying information of said agent from said notification trap, wherein said means includes:
      means for determining when said notification trap contains sufficient identifying information; and
      means for sending a query on said network from said network manager directly to said agent to extract an identifying information from said agent when said notification trap fails to include sufficient identifying information;
   means for comparing said identifying information with a list of previously recorded identifying information to determine when said identifying information has not previously been received; and
   means, responsive to said comparing means, for adding said identifying information to said list when not previously received, thus recording a discovery of said agent on said network.

2. The network of claim 1, wherein:
   said connecting links are Transmission Control Protocol/Internet Protocol (TCPIP) links; and
   said means for transmitting said trap utilizes a Simple Network Management Protocol (SNMP), wherein said agent is an SNMP agent.

3. The network of claim 2, wherein said transmitting means includes means for said user to enter a TCP/IP address of said network manager and said identifying information in said notification trap.

4. The network of claim 3, wherein:
   said identifying information is a host name of said agent;
   said transmitting means includes means for automatically transmitting an IP address of said agent in said trap; and
   said comparing means compares said IP address against a list of previously discovered IP addresses.

5. The network of claim 2, wherein one of said connecting links is a point-to-point link.

6. The network of claim 2, wherein said transmitting means transmits in a broadcast packet environment.

7. The network of claim 2, wherein said receiving means includes means for monitoring said network at said network manager for an instance of said notification trap.

8. The network of claim 1, wherein said notification trap is a coldstart trap.

9. A method for efficient discovery by a network manager of an agent on a network, said method comprising the steps of:
   transmitting a notification trap from said agent to said network manager, said transmission being instantiated by a user of said agent, wherein the transmission of said notification trap is completed without said network manager issuing a broadcast message on the network to solicit said notification trap, and network bandwidth utilized in a notification process is reduced;
   receiving said notification trap at said network manager;
   extracting identifying information of said agent from said notification trap, wherein said extracting step includes:
      determining when said discovery trap contains sufficient identifying information; and
      responsive to said determining step, sending a query on said network from said network manager to said agent to extract an identifying information from said agent when said discovery trap fails to include sufficient identifying information;
   comparing said identifying information with a list of previously recorded identifying information to determine when said identifying information has not previously been received; and
   responsive to said comparing step, adding said identifying information to said list when not previously received, thus recording a discovery of said agent on said network.

10. The method of claim 9, wherein said transmitting step includes the step of creating said trap.

11. The method of claim 10, wherein said creating step includes the steps of:
   prompting a user to enter a series of information, including an IP address of said network manager and said identifying information; and
   configuring said entered information into a format capable of being transmitted over said network.

12. The method of claim 11, wherein:
   said identifying information is a host name of said agent;
   said transmitting step includes the step of automatically transmitting an IP address of said agent in said trap; and
   said comparing step compares said IP address against a list of previously discovered IP addresses.

13. The method of claim 9, wherein:
   said network is configured with Transmission Control Protocol/Internet Protocol (TCP/IP) links;
   said transmitting step utilizes a Simple Network Management Protocol (SNMP), wherein said agent is an SNMP agent; and
   said transmitting step transmits a coldstart trap.

14. The method of claim 9, wherein said receiving step includes the steps of monitoring said network at said network manager for an instance of said notification trap.

15. A computer program product for efficient discovery by a network manager of an agent on a network, said computer program product comprising:
   a computer readable storage medium;
   program instructions on said storage medium for:
      receiving a notification trap at said network manager transmitted from said agents wherein the network trap is one that is generated at said agent and transmitted by said agent independent of said network manager, wherein further said notification trap is generated without said network manager broadcasting a message on the network soliciting said notification trap;

extracting identifying information of said agent from said notification trap, wherein said program instructions for said extracting step includes program instructions for:
- determining whether said discovery trap contains sufficient identifying information; and
- responsive to said determining step, sending a direct query on said network from said network manager to said agent to extract the identifying information from said agent when said discovery trap fails to include sufficient identifying information;

comparing said identifying information with a list of previously recorded identifying information to determine when said identifying information has not previously been received; and responsive to said comparing step, adding said identifying information to said list when not previously received, thus recording a discovery of said agent on said network.

16. The computer program product of claim 15, wherein:
said identifying information is a host name of said agent;
said program instructions for said extracting step includes the step of extracting an IP address of said agent from said trap; and
said program instructions for said comparing step compares said IP address against a list of previously discovered IP addresses.

17. The computer program product of claim 15, wherein:
said network is configured with Transmission Control Protocol/Internet Protocol (TCP/IP) links;
said program instructions for said receiving step receives said trap via a Simple Network Management Protocol (SNMP), wherein said agent is an SNMP agent; and
said program instructions for said receiving step includes program instructions for receiving a coldstart trap generated at said agent during initial set up and power-on of said agent.

18. The computer program product of claim 15, wherein said program instructions for said receiving step includes program instructions for monitoring said network at said network manager for an instance of said notification trap.

* * * * *